United States Patent [19]

Trusock et al.

[11] Patent Number: 4,500,819
[45] Date of Patent: Feb. 19, 1985

[54] AUXILIARY ELECTRIC POWER SUPPLY FOR ELECTRIC WORK VEHICLES

[75] Inventors: George J. Trusock, Battle Creek; James J. Bauer, Richland; Bhupen Gandhi, Battle Creek, all of Mich.

[73] Assignee: Clark Equipment Company, Buchanan, Mich.

[21] Appl. No.: 550,245

[22] Filed: Nov. 9, 1983

[51] Int. Cl.³ .............................................. H02K 47/16
[52] U.S. Cl. ................... 318/106; 318/248; 318/502; 310/129; 310/148; 363/32
[58] Field of Search .............. 318/105, 106, 248, 292, 318/331, 501, 502, 361, 540, 541, 148, 360; 363/32, 103; 310/129, 230, 68 R, 234, 68 D, 130; 307/47, 49

[56] References Cited

U.S. PATENT DOCUMENTS

| | | | |
|---|---|---|---|
| 693,098 | 2/1902 | Ball | 363/32 |
| 1,326,227 | 12/1919 | Turbayne | 363/103 |
| 3,183,386 | 5/1965 | Miller | 318/105 X |
| 3,875,495 | 4/1975 | Middlebrook | 363/32 |
| 4,237,410 | 12/1980 | Erickson et al. | 318/248 X |

Primary Examiner—J. V. Truhe
Assistant Examiner—Bentsu Ro
Attorney, Agent, or Firm—Reising, Ethington, Barnard, Perry & Milton

[57] ABSTRACT

An electric work vehicle with a battery powered traction motor and pump motor is provided with an auxiliary power supply for a load circuit requiring voltage lower than that of the battery. The pump motor is provided with an auxiliary brush at a location between a pair of motor brushes and the auxiliary load circuit is connected between the auxiliary brush and one of the motor brushes. The auxiliary brush is positioned relative to the motor brush so that it supplies the voltage required by the auxiliary load circuit.

3 Claims, 4 Drawing Figures

AUXILIARY ELECTRIC POWER SUPPLY FOR ELECTRIC WORK VEHICLES

FIELD OF THE INVENTION

This invention relates to an auxiliary electric power supply for DC electrical systems requiring two different voltages in the system. More particularly, this invention relates to a DC electrical system in which a DC motor is used as a generator during motor operation.

BACKGROUND OF THE INVENTION

Many industrial work vehicles, particularly electric lift trucks, operate on 36 or 48 volt batteries for energizing the traction motor. Some electric vehicles operate on 72 volt batteries. In such vehicles, the battery voltage is too high for use as the power supply for auxiliary devices such as the vehicle lights, horn, solenoid hydraulic valves, and the like. Such vehicles need an auxiliary power supply of lower voltage, preferably of 12 volts, because many standard automotive components including lamps and horns can be used and are available at lower cost than high voltage components.

In the prior art, electric work vehicles have been provided with an auxiliary power supply having a voltage lower than the battery voltage. In one such auxiliary power supply a dropping resistor is connected in series with the battery to provide a lower voltage for the auxiliary components. This arrangement is wasteful of power and the heat given off from the resistors may be objectionable. Also, in the prior art, it is known to tap the main battery to obtain a reduced voltage supply; however, this technique is not acceptable because uneven use of the battery cells is detrimental to the battery. Electronic power supplies are also known for reducing a higher DC voltage to a desired value. However, such power supplies are costly, especially where a large amount of power is required. Also, the electronic power supply requires additional compartment space on the vehicle.

For applications requiring relatively high power, it is known to obtain DC-to-DC voltage conversion by use of a rotary transformer. Such a transformer is shown in the Ball U.S. Pat. No. 693,098 and comprises a dynamoelectric machine having an armature driven by a separate motor. The armature winding is connected with a commutator having a set of primary brushes connected with a DC voltage source. A set of secondary brushes coacts with the commutator to derive an output voltage from the rotary transformer.

A rotary transformer is also described in the Middlebrook U.S. Pat. No. 3,875,495. The transformer of the Middlebrook patent comprises a dynamoelectric machine having a set of primary brushes connected with a voltage source which energizes the machine as a DC motor. Two sets of secondary brushes are connected in parallel to the output terminals for producing an output voltage of the transformer. The two sets of secondary brushes are variably positioned in opposite angular relation to the primary set of brushes by means of a manual or an automatic servo control.

A general object of this invention is to provide an improved auxiliary power supply for an electric work vehicle.

SUMMARY OF THE INVENTION

In accordance with this invention, an electric work vehicle is provided with an auxiliary DC power supply with a voltage lower than the vehicle battery by using a DC motor for deriving a generated voltage during motor operation. This is accomplished by providing an auxiliary brush on the commutator of a motor energized from the battery and deriving a reduced voltage between the auxiliary brush and one of the motor brushes.

According to the invention, an auxiliary power source is provided on an electric vehicle by a pump motor; the pump motor and the traction motor are energized from the vehicle battery; an auxiliary brush is provided on the commutator of the pump motor at a fixed location between a pair of motor brushes. An electrical load circuit which requires a lower voltage than that of the battery is connected between the auxiliary brush and one of the motor brushes. The auxiliary brush is fixed at a location which produces the lower voltage required by the auxiliary load circuit.

A more complete understanding of this invention will be obtained from the detailed description that follows taken with the accompanying drawings.

BEST MODE FOR CARRYING OUT THE INVENTION

Figure 1:
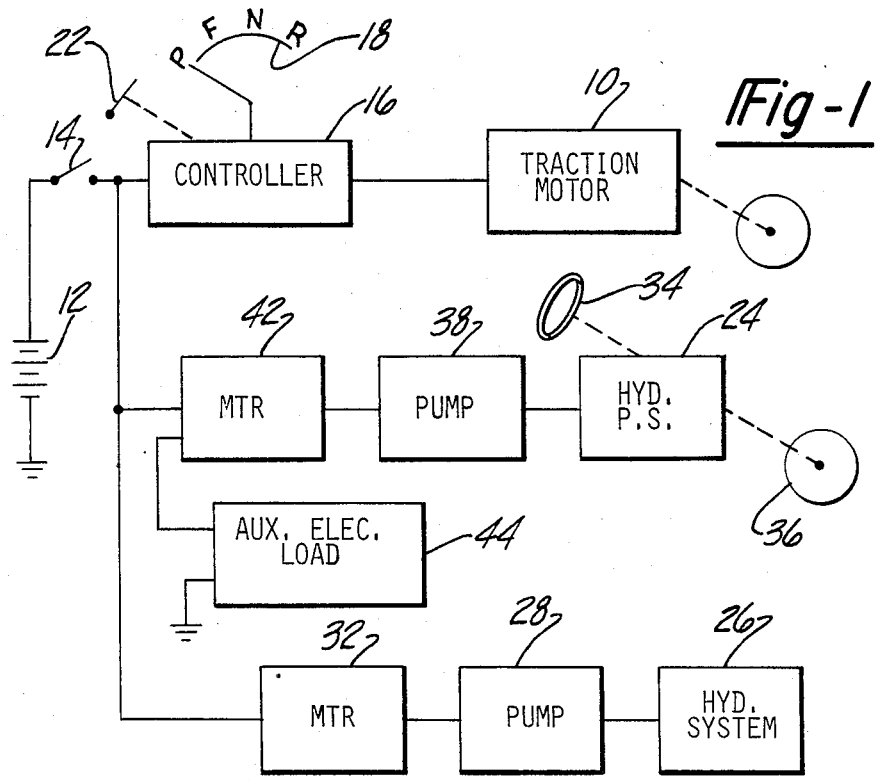
FIG. 1 represents an electric work vehicle embodying the subject invention.

Referring now to the drawings, there is shown an illustrative embodiment of the invention in an auxiliary power supply for an electric work vehicle. It will be appreciated, as the description proceeds, that the invention is applicable to a wide variety of load circuits and may be used in other embodiments.

Referring now to FIG. 1, the diagram represents an electric work vehicle, typically a lift truck. The vehicle comprises a DC traction motor 10 which is energized from a storage battery 12 of 36 volts. The traction motor 10 is connected to the storage battery 12 through an on/off switch 14 and a controller 16. The controller 16 is provided with a drive mode selector 18 which permits the driver to select forward or reverse drive or to place the drive system in neutral mode or park mode. The controller 16 also includes the speed control for the traction motor with an accelerator pedal 22 operated by the driver.

The vehicle also includes a power steering system 24 and a hydraulic system 26 for actuating the fork or other load handling devices of the vehicle. The hydraulic system 26 is supplied with pressurized fluid by a pump 28 which is driven by a DC motor 32. The DC motor 32 is energized with the battery voltage through the on/off switch 14.

The power steering system 24 is manually controlled by the steering wheel 34 and is operative to actuate the dirigible wheels 36 of the vehicle. The hydraulic power steering system 24 receives pressurized fluid from a pump 38 which is driven by a DC motor 42. The DC motor 42 is energized directly from the battery 12 through the on/off switch 14.

The vehicle includes an auxiliary electric load circuit 44 which requires a DC voltage which is less than that of the battery 12, for example 12 volts. The auxiliary electric load circuit 44 includes for example the vehicle head lights, tail and back-up lights, horn, rotating beacon lights and the control circuit for hydraulic valves, such auxiliary devices requiring 12 volts. The auxiliary electric load circuit 44 is electrically connected with the armature of the DC motor 42 which serves as the auxiliary power supply in a manner to be described subsequently.

Figure 2:
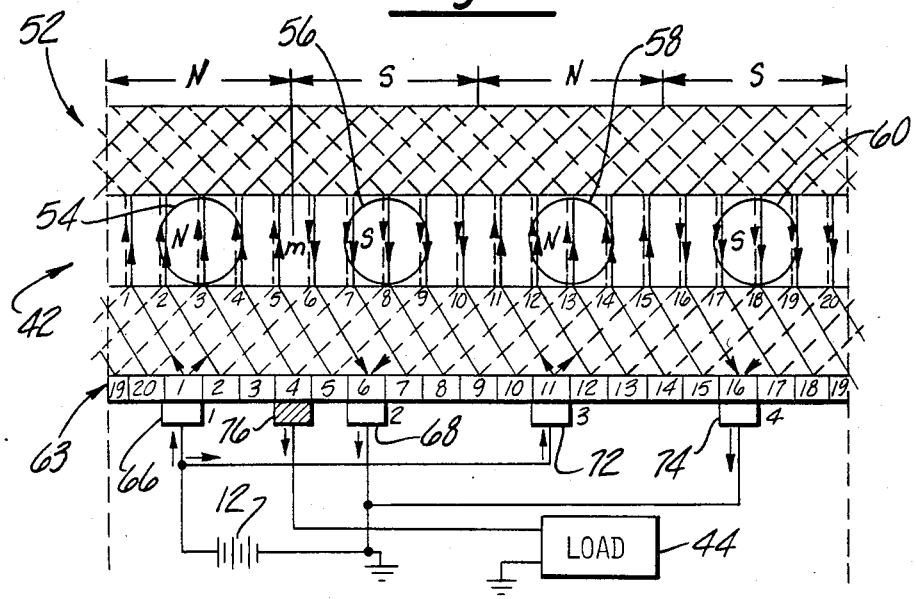
FIG. 2 is a diagram of an armature winding commutator and brushes.

FIG. 2 depicts the electrical circuit of the motor 42. In this embodiment, the motor 42 is a four pole DC motor provided with a lap winding. It will be appreciated that the invention is useful with any DC motor; the motor may be series, shunt or compound or it may have a permanent magnet field. Also, the armature winding may be of any type such as the lap winding or a wave winding.

The motor 42 is shown diagrammatically in FIG. 2 in simplified form with a developed layout of the armature winding 52. The motor has four poles 54, 56, 58 and 60 which are depicted, for convenience, as circles. The armature winding 52 is a lap winding with 20 coils. The motor has a commutator 63 with 20 segments or bars, each connected with one end of a pair of adjacent coils. The motor is provided with a first pair of motor brushes 66 and 68 spaced at approximately at 180 electrical degrees or 90 mechanical degrees. The motor also has a second pair of motor brushes 72 and 74 spaced at 180 electrical degrees from each other with brush 72 being 180 electrical degrees from brush 68. Brushes 66 and 72 are connected in parallel to the positive terminal of the battery 12 and brushes 68 and 74 are connected in parallel with the negative terminal of the battery. As indicated by the arrows, current flows into the brushes 66 and 72 and it flows out of the brushes 68 and 74.

In order to derive a voltage less than the battery voltage, an auxiliary brush 76 is provided at a location intermediate the brushes 66 and 68. Brush 76 is connected to one terminal of the auxiliary load circuit 44. The other terminal of the load circuit is connected to the negative terminal of the battery 12 through a ground return as indicated.

In operation, when the voltage of battery 12 is impressed across the motor brushes, the armature windings are energized to develop the torque required by the motor load. In the motor action, the armature windings develop a back emf which is opposite and substantially equal to the voltage applied to the winding. Thus, the voltage which appears at brushes 66 and 72 is approximately equal to that at the positive terminal of the battery 12 and the voltage at brushes 68 and 74 is approximately equal to that at the negative terminal of the battery or ground. The voltage appearing at any commutator bar between the brushes 66 and 68 relative to the negative terminal of the battery or ground will be less than that at the commutator bar engaged by the brush 66. The voltage on an intermediate commutator bar is approximately proportional to the angular displacement of the commutator bar from the commutator bar in engagement with brush 68. Thus, with the auxiliary brush 76 located at approximately 60 electrical degrees from the commutator bar 68, the voltage developed on the auxiliary brush 76 will be approximately 12 volts.

Figure 3:
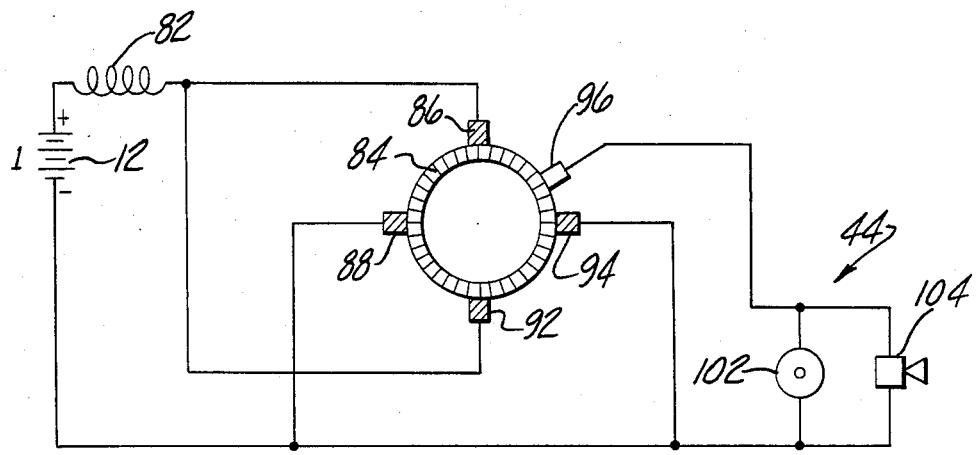
FIG. 3 shows the brush arrangement with a single auxiliary brush.

FIG. 3 is a schematic diagram of an auxiliary power supply such as that shown in FIG. 2. FIG. 3 depicts a DC motor with a series field winding 82 and commutator having 36 bars. The armature winding, not shown, may be of any conventional winding configuration. The motor has a first pair of motor brushes 86 and 88 and a second pair of motor brushes 92 and 94. An auxiliary brush 96 is disposed between the motor brushes 94 and 86 at an intermediate location such that it develops a voltage of approximately 12 volts relative to brush 94 and the negative terminal of the battery 12. The auxiliary load circuit 44 is depicted as including a lamp 102 and a horn 104 which are rated for operation at 12 volts.

Figure 4:
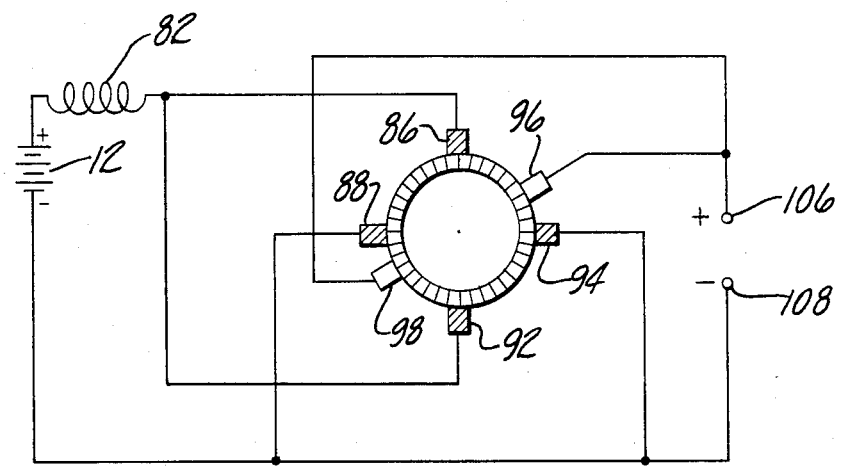
FIG. 4 shows the brush arrangement with two auxiliary brushes connected in parallel.

FIG. 4 shows an embodiment of the auxiliary power supply similar to that of FIG. 3 except that the power supply is adapted for a higher current carrying capacity. For this purpose, a second auxiliary brush 98 is provided at a location between motor brushes 88 and 92 at a fixed position such that it develops a voltage of approximately 12 volts relative to the brush 88 and the negative terminal of the battery. Auxiliary brushes 96 and 98 are connected in parallel to the positive output terminal 106 of the auxiliary power supply whereas motor brushes 88 and 94 are connected in parallel to the negative output terminal 108 of the power supply.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In an electrical system for a work vehicle of the type comprising an electric traction motor, a storage battery for energizing the traction motor, a hydraulic system including a pump and a DC motor for driving the pump, said traction motor and said DC motor being connected with said battery for energization thereby, and an auxiliary electrical load circuit which requires a lower voltage than that of said battery, said DC motor having an armature winding, a commutator connected with the armature winding and at least one pair of motor brushes coacting with the commutator, and an auxiliary brush coacting with said commutator at a location between said pair of motor brushes, said auxiliary load circuit being connected between said auxiliary brush and one of said pair of motor brushes, said auxiliary brush being fixed at a location which produces the voltage required by said auxiliary load circuit.

2. The invention as defined in claim 1 wherein said DC motor has plural pairs of motor brushes coacting with the commutator and including, plural auxiliary brushes coacting with said commutator, each auxiliary brush being at a location between a respective pair of motor brushes, said auxiliary brushes being electrically connected together and corresponding motor brushes of said plural pairs of motor brushes being electrically connected together, said auxiliary load circuit being connected between said auxiliary brushes and said correspondence motor brushes.

3. The invention as defined in claim 1 wherein said armature winding comprises multiple coils and said commutator comprises multiple commutator bars connected respectively with the coils of the armature winding.

said auxiliary brush coacting with said commutator at a location between said pair of brushes so that the number of commutator bars between the auxiliary brush and one of said pair of brushes produces the voltage required by said auxiliary load circuit.

* * * * *